United States Patent
Su et al.

(10) Patent No.: US 9,193,054 B2
(45) Date of Patent: Nov. 24, 2015

(54) PNEUMATIC IMPACT TOOL WITH A SPINDLE POSITIONING DEVICE

(71) Applicant: BASSO INDUSTRY CORP., Taichung (TW)

(72) Inventors: San-Yih Su, Taichung (TW); Cheng-Wei Lai, Taichung (TW)

(73) Assignee: BASSO INDUSTRY CORP., Taichung (TW)

( * ) Notice: Subject to any disclaimer, the term of this patent is extended or adjusted under 35 U.S.C. 154(b) by 505 days.

(21) Appl. No.: 13/740,072

(22) Filed: Jan. 11, 2013

(65) Prior Publication Data

US 2013/0180746 A1 Jul. 18, 2013

(30) Foreign Application Priority Data

Jan. 17, 2012 (TW) .............................. 101201059 U

(51) Int. Cl.
B25B 21/02 (2006.01)
B25D 17/00 (2006.01)
F16B 35/00 (2006.01)

(52) U.S. Cl.
CPC ............... *B25D 17/00* (2013.01); *B25B 21/02* (2013.01); *F16B 35/005* (2013.01)

(58) Field of Classification Search
CPC .... B25B 21/02; B25B 21/002; B25B 21/004; B25B 21/026; B25B 21/023; B25B 13/465; B25B 23/0021; B25B 23/141; B23Q 5/045; B23Q 5/28; F16H 37/041; F16B 35/005; B25D 17/00

USPC ............. 173/29, 104, 48, 216, 217, 170; 81/57.13, 57.29, 467, 469, 470; 279/30, 80, 97, 143, 906

See application file for complete search history.

(56) References Cited

U.S. PATENT DOCUMENTS

| | | | | |
|---|---|---|---|---|
| 4,625,999 | A * | 12/1986 | Valentine et al. | 285/24 |
| 5,505,676 | A * | 4/1996 | Bookshar | 477/178 |
| 5,564,717 | A * | 10/1996 | Alberts | 279/145 |
| 6,109,366 | A * | 8/2000 | Jansson et al. | 173/216 |
| 6,261,035 | B1 * | 7/2001 | Moores et al. | 408/239 R |
| 6,394,715 | B1 * | 5/2002 | Boyle et al. | 408/238 |
| 6,789,447 | B1 * | 9/2004 | Zinck | 81/57.13 |
| 6,863,135 | B2 * | 3/2005 | Kamimura et al. | 173/216 |
| 6,929,074 | B1 * | 8/2005 | Lai | 173/178 |
| 7,828,077 | B1 * | 11/2010 | Miller et al. | 173/217 |
| 7,886,840 | B2 * | 2/2011 | Young et al. | 173/168 |
| 8,695,725 | B2 * | 4/2014 | Lau et al. | 173/170 |
| 8,925,646 | B2 * | 1/2015 | Seith et al. | 173/109 |

* cited by examiner

*Primary Examiner* — Scott A. Smith
(74) *Attorney, Agent, or Firm* — Marger Johnson

(57) ABSTRACT

A pneumatic impact tool includes a spindle extending along an X-axis, an output shaft extending along a Z-axis, and a spindle positioning device that includes a bushing and a stop pin. The bushing is threaded in a housing, and has a stop surface and a frustoconical outer surface. The stop surface obstructs the spindle from moving away from the output shaft. The frustoconical outer surface has opposite first and second ends. The first end is nearer to the X-axis and farther away from the Z-axis than the second end. The stop pin is disposed removably in the housing, and has an engaging surface abutting against the frustoconical outer surface, so as to prevent the bushing from moving in the housing in a direction away from the output shaft.

4 Claims, 4 Drawing Sheets

PNEUMATIC IMPACT TOOL WITH A
SPINDLE POSITIONING DEVICE

CROSS-REFERENCE TO RELATED
APPLICATION

This application claims priority of Taiwanese Application No. 101201059, filed on Jan. 17, 2012.

BACKGROUND OF THE INVENTION

1. Field of the Invention

This invention relates to a positioning device, and more particularly to a spindle positioning device for a pneumatic impact tool.

2. Description of the Related Art

Referring to FIG. 1, a conventional pneumatic impact tool 1 disclosed in US2011/0139474A1 includes: a housing 11; a spindle 12 disposed rotatably in the housing 11 and extending along an X-axis for power transmission; an output shaft 13 disposed rotatably in the housing 11, geared to the spindle 12, and extending along a Z-axis perpendicular to the X-axis for outputting a power; and a bushing 14. The spindle 12 has a position-limiting surface 121 parallel to the Z-axis. The bushing 14 is threaded in the housing 11, and has an end surface or stop surface 141 abutting against the position-limiting surface 121.

As such, when the spindle 12 is driven by a power source (not shown), such as a pneumatic cylinder, to rotate, due to the geared connection between the spindle 12 and the output shaft 13, the output shaft 13 is rotated to output the power. At the same time, the stop surface 141 of the bushing 14 obstructs the position-limiting surface 121 of the spindle 12 to prevent the spindle 12 from moving away from the output shaft 13 along the X-axis.

However, since the bushing 14 is just threaded to the housing 11, during power transmission, the spindle 12 pushes the bushing 14 to move in the housing 11 in a direction away from the output shaft 13 due to reaction force coming from the output shaft 13, thereby resulting in a change to the distance between the spindle 12 and the output shaft 13, which affects adversely smooth rotation of the spindle 12 and the output shaft 13 and reduces the service life of the pneumatic impact tool 1.

To overcome such drawbacks, glue is applied between the bushing 14 and the housing 11 to prevent movement of the bushing 14 in the housing 11. As a result, the spindle 12 and the output shaft 13 cannot be removed for replacement, repair, and maintenance.

SUMMARY OF THE INVENTION

The object of this invention is to provide a pneumatic impact tool with a spindle positioning device that can prevent effectively a bushing from moving in a housing and that is mounted removably in the housing to allow replacement, repair, and maintenance of a spindle and an output shaft.

Accordingly, a pneumatic impact tool of this invention includes a housing, a spindle disposed rotatably in the housing and extending along an X-axis, an output shaft disposed rotatably in the housing, extending along a Z-axis perpendicular to the X-axis, and geared to the spindle, and a spindle positioning device. The spindle positioning device includes a bushing and a stop pin. The bushing is threaded in the housing, and has a stop surface and a frustoconical outer surface. The stop surface obstructs the spindle from moving away from the output shaft. The frustoconical outer surface has opposite first and second ends. The first end is nearer to the X-axis and farther away from the Z-axis than the second end. The stop pin is disposed removably in the housing, and has an engaging surface abutting against the frustoconical outer surface, so as to prevent the bushing from moving in the housing in a direction away from the output shaft.

Due to the presence of the stop pin, movement of the bushing in the housing can be prevented effectively. Furthermore, when the stop pin is removed, the replacement, repair, and maintenance of the spindle and the output shaft are allowed.

BRIEF DESCRIPTION OF THE DRAWINGS

These and other features and advantages of this invention will become apparent in the following detailed description of a preferred embodiment of this invention, with reference to the accompanying drawings, in which.

DETAILED DESCRIPTION OF THE PREFERRED
EMBODIMENT

Figure 1:
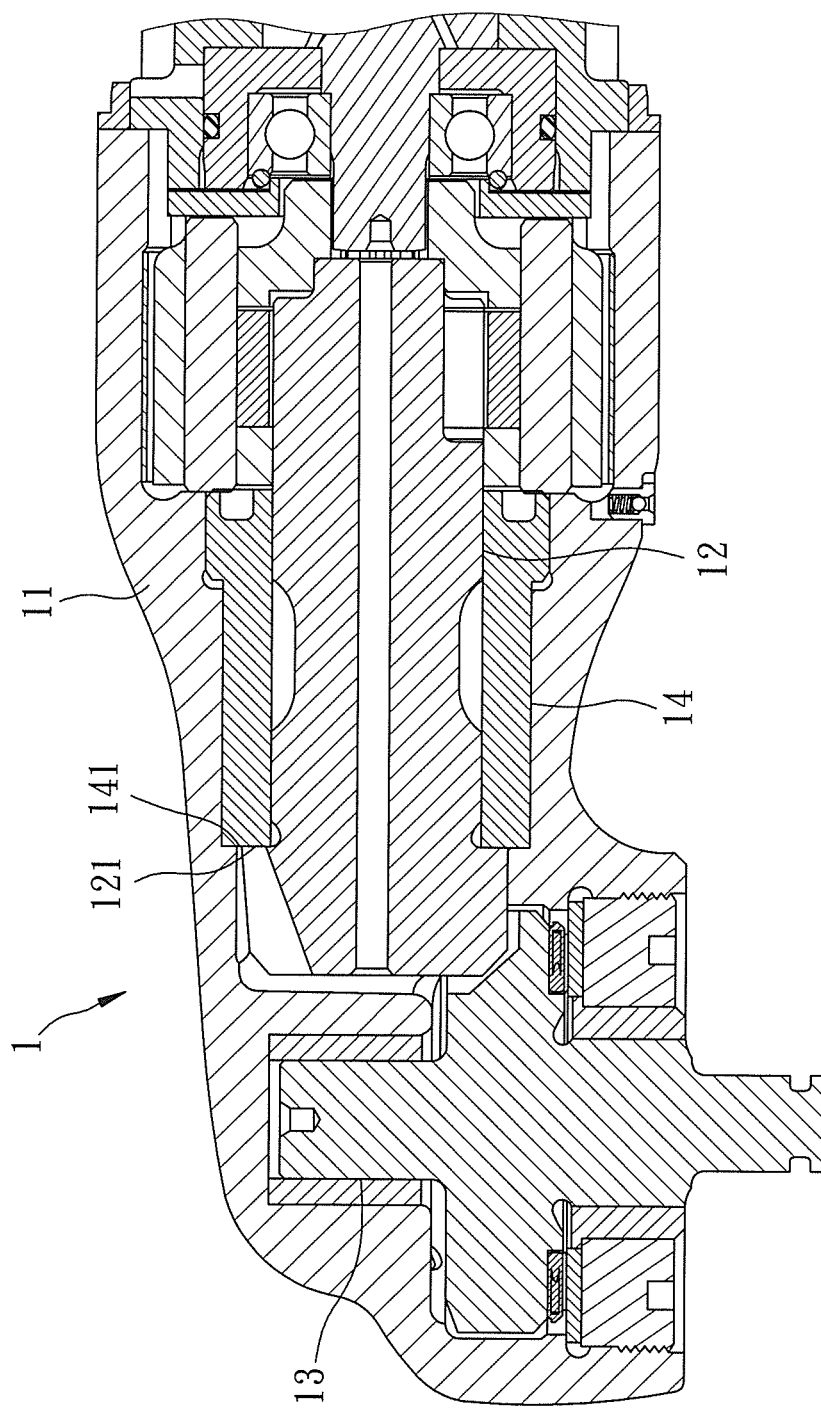
FIG. 1 is a fragmentary sectional view of a conventional pneumatic impact tool disclosed in US2011/0139474A1.
Figure 2:
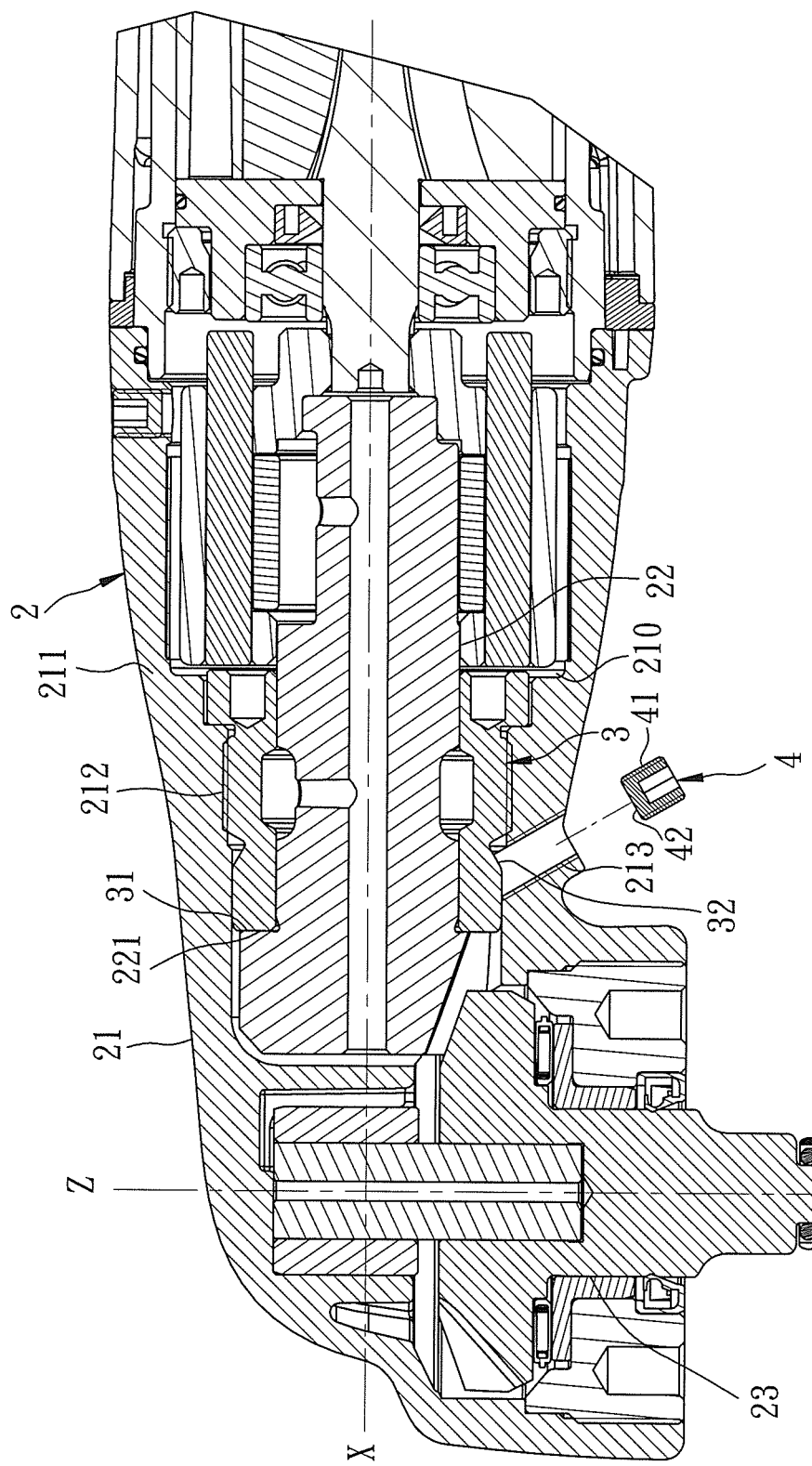
FIG. 2 is a fragmentary sectional view of the preferred embodiment of a pneumatic impact tool according to this invention, illustrating that a stop pin is removed from an inclined threaded hole.
Figure 3:
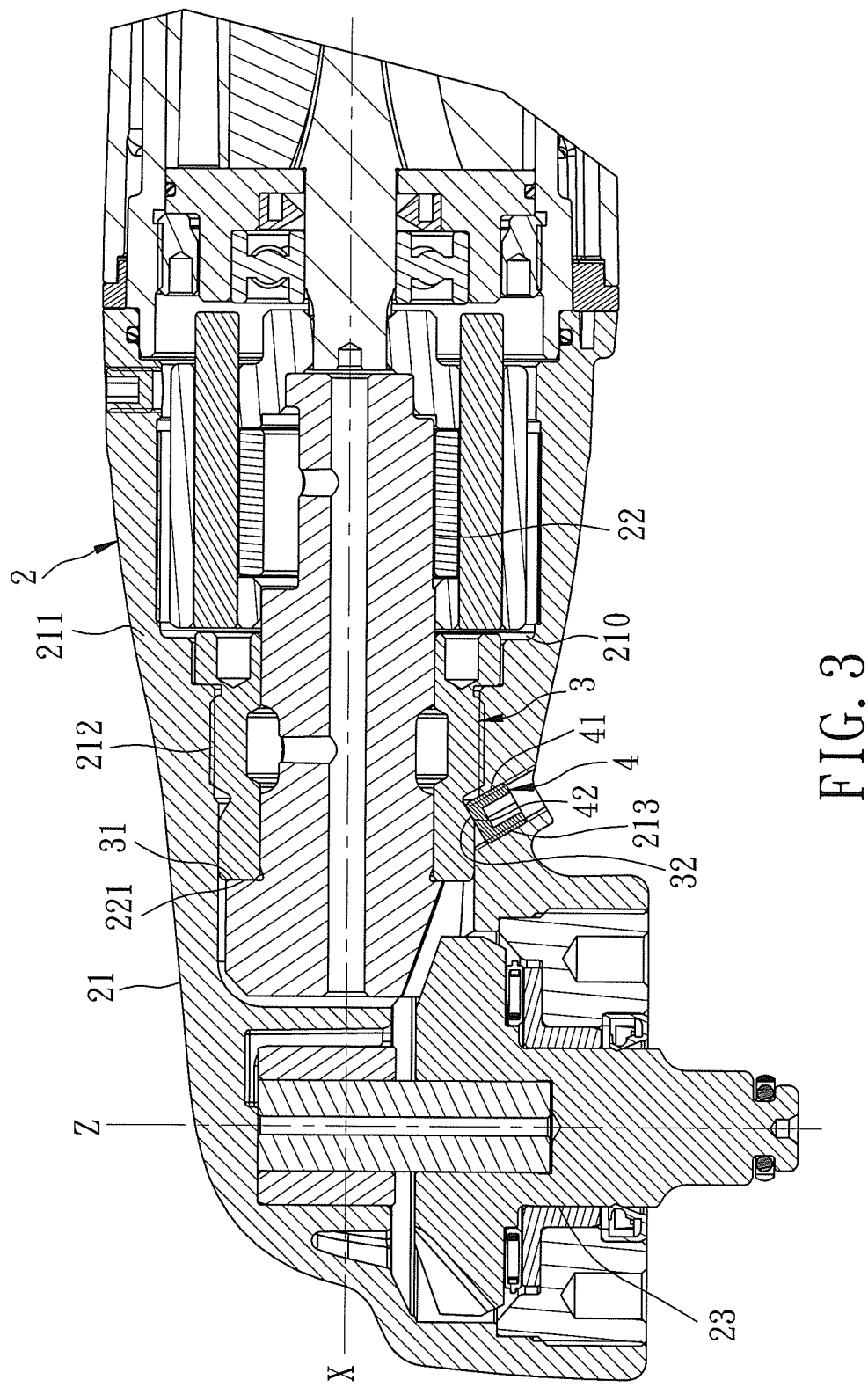
FIG. 3 is a view similar to FIG. 2 but illustrating that the stop pin is threaded in a housing to abut against a frustoconical outer surface of a bushing.

Referring to FIGS. 2 and 3, the preferred embodiment of a pneumatic impact tool 2 according to this invention includes a housing 21, a spindle 22, an output shaft 23, and a spindle positioning device. The housing 21 has a housing wall 211 defining an accommodating chamber 210, an inner threaded hole 212 defined by an inner surface of the housing wall 211, and an inclined threaded hole 213 formed through the housing wall 211. The spindle 22 extends along an X-axis, and is disposed rotatably in the accommodating chamber 210 of the housing 21 for power transmission. The output shaft 23 extends along a Z-axis, is disposed in the accommodating chamber 210 of the housing 21, and is geared to the spindle 22 for outputting a power. The spindle 22 has a position-limiting surface 221 parallel to the Z-axis. The spindle positioning device includes a bushing 3 and a stop pin 4.

Figure 4:
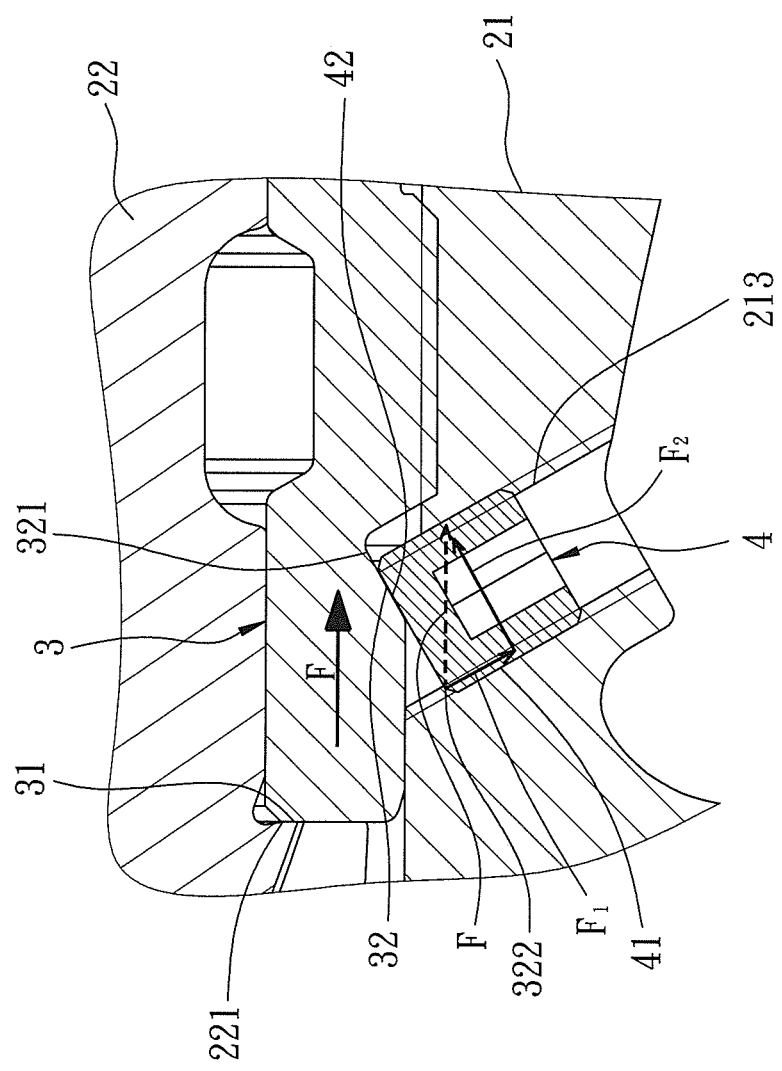
FIG. 4 is an enlarged view of a portion of FIG. 3, which includes the stop pin and the frustoconical outer surface of the bushing.

The bushing 3 extends along the X-axis in the accommodating chamber 210, is threaded in the inner threaded hole 212, and has a stop surface 31 constituted by an end surface of the bushing 3 and abutting against and parallel to the position-limiting surface 221 of the spindle 22, and a frustoconical outer surface 32 centered at the X-axis and having opposite first and second ends 321, 322 (see FIG. 4). The first end 321 is nearer to the X-axis than the second end 322, and is farther away from the Z-axis than the second end 322.

The stop pin 4 has an external thread portion 41 threaded in the inclined threaded hole 213 of the housing 21, and an engaging surface 42 constituted by an end surface thereof and intimately abutting against the frustoconical outer surface 32.

During assembly, the bushing 3 is first threaded into the inner threaded hole 212 of the housing 21 until the stop surface 31 comes into contact with the position-limiting surface 221 of the spindle 22. Next, the stop pin 4 is threaded into the inclined threaded hole 213 of the housing 21 until the engaging surface 42 of the stop pin 4 comes into contact with the frustoconical outer surface 32 of the bushing 3, so as to prevent the bushing 3 from moving in the housing 21.

With further reference to FIG. 4, when the spindle 22 is driven by a power source (not shown), such as a pneumatic cylinder, to rotate, due to the geared connection between the spindle 22 and the output shaft 23, the output shaft 23 is rotated to output the power. At the same time, since the stop surface 31 of the bushing 3 abuts against the position-limiting surface 221 of the spindle 22, and since the engaging surface 42 of the stop pin 4 abuts against the frustoconical outer surface 32 of the bushing 3, the bushing 3 obstructs the spindle 22 from moving away from the output shaft 23 along the X-axis. Furthermore, since the stop pin 4 and the inclined threaded hole 213 are inclined, during power transmission, a reaction force F is applied to the stop pin 4 by the output shaft 23, and has an axial force component F1 and a radial force component F2, which is exerted on a wall defining the inclined threaded hole 213. Consequently, the stop pin 4 can obstruct effectively the bushing 3 from moving away from the output shaft 23 along the X-axis. When replacement, repair, or maintenance of the spindle 22 and/or the output shaft 23 is desired, it is only necessary to remove the stop pin 4 and the bushing 3, thereby resulting in convenience during use of the pneumatic impact tool 2.

To sum up, the pneumatic impact tool 2 of this invention has the following advantages:

The bushing 3 can cooperate with the stop pin 4 to prevent effectively movement of the spindle 22 relative to the output shaft 23 in the housing 21. When the stop pin 4 is removed from the housing 1, the spindle 22 is unlocked from the bushing 3. That is, due to the presence of the stop pin 4, the spindle-positioning effect of the bushing 3 is promoted. In addition, the bushing 3 and the stop pin 4 can be removed to perform replacement, repair, or maintenance of the spindle 22 and the output shaft 23, so that the pneumatic impact tool 2 is convenient to use. Thus, the object of this invention is achieved.

With this invention thus explained, it is apparent that numerous modifications and variations can be made without departing from the scope and spirit of this invention. It is therefore intended that this invention be limited only as indicated by the appended claims.

We claim:

1. A pneumatic impact tool comprising:
   a housing;
   a spindle disposed rotatably in said housing and extending along an X-axis;
   an output shaft disposed rotatably in said housing, extending along a Z-axis perpendicular to the X-axis, and geared to said spindle; and
   a spindle positioning device including
      a bushing threaded in said housing and having a stop surface and a frustoconical outer surface, said stop surface obstructing said spindle from moving away from said output shaft, said frustoconical outer surface being centered at the X-axis and having opposite first and second ends, said first end being nearer to the X-axis and farther away from the Z-axis than said second end, and
      a stop pin disposed removably in the housing and having an engaging surface abutting against said frustoconical outer surface, so as to prevent said bushing from moving in the housing in a direction away from said output shaft.

2. The pneumatic impact tool as claimed in claim 1, wherein said spindle has a position-limiting surface abutting against said stop surface of said bushing, said stop surface being constituted by an end surface of said bushing.

3. The pneumatic impact tool as claimed in claim 1, wherein said stop pin is threaded in said housing, and has an end surface constituting said engaging surface.

4. The pneumatic impact tool as claimed in claim 1, wherein said stop pin is inclined with respect to the X-axis and the Z-axis.

\* \* \* \* \*